Dec. 9, 1941. J. S. NORMAND 2,265,923
PROCESS OF TREATING OIL AND GAS WELLS TO INCREASE PRODUCTION
Filed Nov. 17, 1938
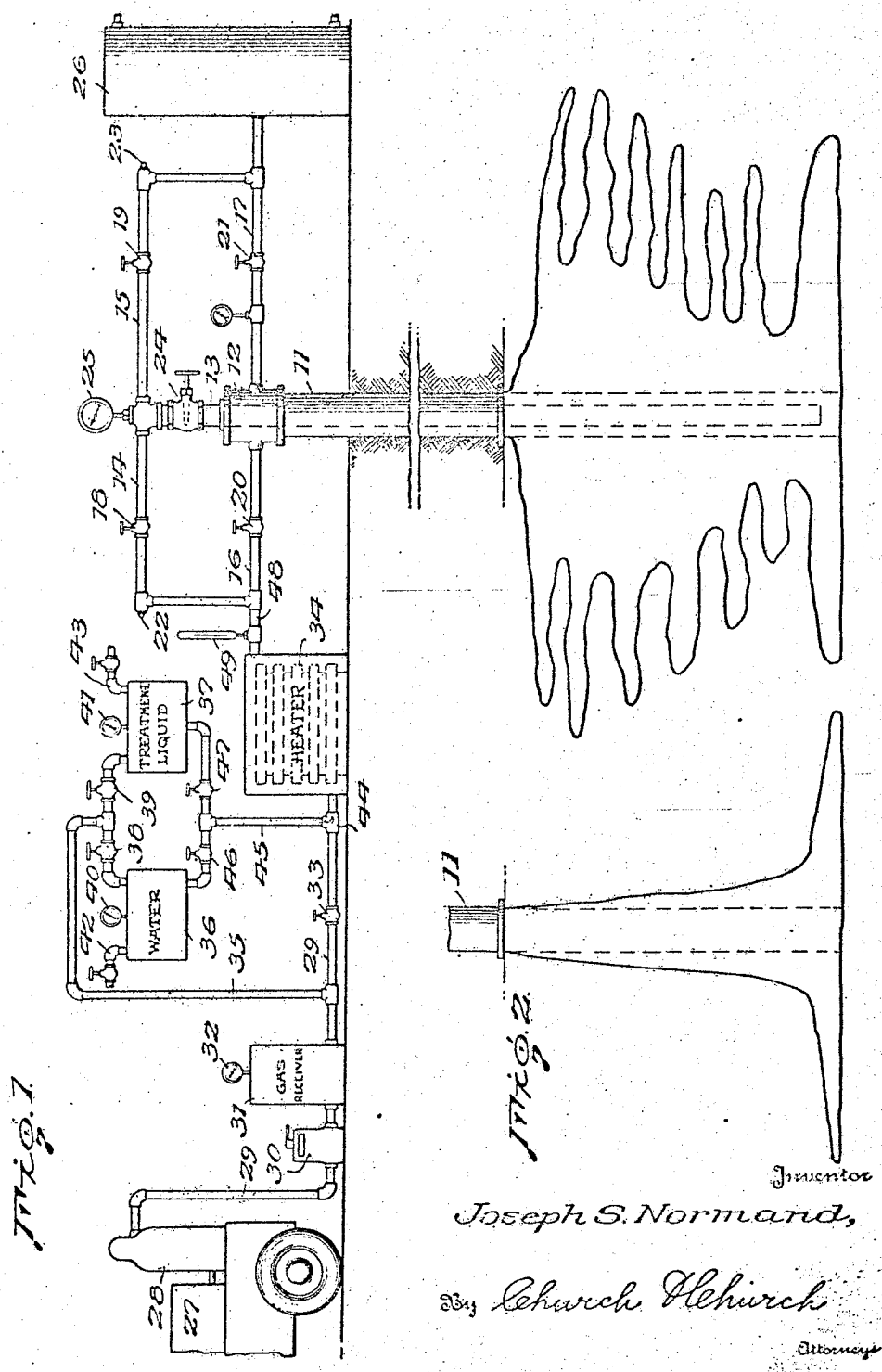
Inventor
Joseph S. Normand,
By Church & Church
Attorneys Patented Dec. 9, 1941

2,265,923

UNITED STATES PATENT OFFICE 2,265,923

PROCESS OF TREATING OIL AND GAS WELLS TO INCREASE PRODUCTION

Joseph S. Normand, Fort Worth, Tex.

Application November 17, 1938, Serial No. 241,030

7 Claims. (Cl. 166—23)

This invention relates to the treatment of oil and gas wells, and more particularly to an improved method of facilitating and augmenting the flow of such wells by removing obstructions to flow existing in the producing formation adjacent the well bore, whether such obstructions are inherent in the producing formation or have accumulated during a period of operation of the well, and by increasing the porosity and permeability of the producing formation.

The present application is a continuation in part of my pending application Serial Number 194,673, Process of treating oil wells, filed March 8, 1938.

It is well known that the rate of flow of oil and gas wells gradually declines in time, and that the cause of such lessening of flow is that the pores and interstices of the producing formation adjacent the bottom of the well bore become clogged by paraffin, asphalt, earth particles and other sediment. It is also well known that some new wells that have been drilled into a producing formation of fine-grained rock such as dolomite, or certain hard limestones, are initially either unable to produce at all or unable to produce satisfactorily, and it has become a general practice in order to "bring in" such new wells and to increase the flow from old wells, to "acidize" the well, that is, to introduce into the well a charge of an aqueous acid solution capable of attacking the material of the formation by reacting with various constituents thereof, particularly the carbonates, of which many lime formations are almost entirely constituted, and of which a large percentage is found in nearly all of the sand formations. After the aqueous acid solution has been dumped into the well, it has been the general practice to apply thereto a pressure, by a liquid "load" or a gas "load," sufficient to force it laterally as far as possible into the producing formation.

Various acids are used for this purpose, particularly hydrochloric acid in the form of commercial muriatic acid, which is relatively inexpensive and which usually forms salts more readily soluble than those of nitric, sulfuric and other acids. In the case of old wells in which the rate of flow has declined materially from its initial rate of flow, it has likewise become a general practice to clean the well of paraffin, asphalt, and similar substances and sediment, in various ways, and to then "acidize" the well. The methods used to remove paraffin and other accumulated impurities and sediments have included mechanical means such as scraping, melting of the paraffin by hot steam or hot inert gases, and particularly by the use of various liquids which dissolve the paraffin or asphalt or otherwise change their characteristics and render them removable.

In "acidizing" an old well, particularly one previously acidized, more acid usually has been used than would be used in a new well, because in the old well various channels have been formed and the acid must be forced to a greater distance from the bore in order to be effective and to reach new areas. Likewise, in a new well cleaning may be unnecessary, or need not be so long extended as in an old well. In general, however, the "acidizing" of a well has been carried out in the same manner whether it is an old well or a new well, and in any case the well must be clean, or reasonably clean, if the "acidizing" is to be effective.

One of the objects of the present invention is to provide a method of treating a well which will accelerate the action of the liquid substances heretofore used in treating oil and gas wells, whether used for cleaning or acidizing the well or both, and which will thereby reduce the time required for the treatment. A further object is to provide such a method which will increase the effectiveness of such liquids not only so as to reduce the quantity required, and to increase the distance from the well bore to which it can be forced, and hence increase the volume of the producing formation that will be subjected to treatment, but also to render it effective against substances which otherwise would not be affected thereby. Still further objects of the invention are to provide such a method which can be carried out economically, which will render further treatment of a well unnecessary for a maximum period of time, and which can be carried out to effect both the cleaning and the acidizing of a well with a minimum of equipment. Further objects of the invention, and the manner of carrying out the process, as well as the novel effects resulting therefrom, will be apparent from the following specification when read with reference to the accompanying drawing, in which:

Figure 1 is a diagrammatic illustration of a typical oil well installation with suitable apparatus connected thereto for carrying out the process of my invention, showing diagrammatically one effect of such process upon the producing formation; and Fig. 2 is a diagrammatic view, similar to a part of Fig. 1, showing the effect of the processes heretofore used.

In the treatment of oil or gas wells to augment their flow, in accordance with my invention, the liquids used are those which are indicated by experience in treating wells in the same or like formations, or those which laboratory tests upon samples from the producing formation indicate would be effective to produce the solvent or chemical action desired. Many such liquids have been used advantageously in well treatment, and for the purposes of this specification, I have adopted and use the term "treatment liquid" to indicate any substance or solution or mixture thereof which is liquid under normal temperatures at atmospheric pressure and capable of dissolving paraffin or asphalt, such as carbon tetrachloride or hydrocarbon compounds and mixtures thereof such as benzine, naphtha, or casinghead gasoline, and likewise to mean any substance or solution or mixture of substances which is liquid under normal temperatures at atmospheric pressure and capable of reacting chemically with any constituent of the producing formation to form reaction products which may be removed from the well.

Generally stated, my invention comprises the treatment of a well by preheating the producing formation adjacent the well bore, applying a pressure sufficiently in excess of the rock pressure to force the fluid from the bottom of the well bore back into the producing formation away from the well bore and, while maintaining such pressure, introducing into the top of the well a hot compressed gaseous medium containing the treatment liquid in the form of vapor, the temperature of such gaseous medium and the face of the producing formation, as well as the parts with which it contacts on the way thereto, being maintained in excess of the temperature of condensation of the treatment liquid at the existing pressure.

In acidizing a well, it is essential that the bottom of the well bore be clean, so that the acid can reach the producing formation, and to prevent the generation by the action of the acid upon the sediment and other substances, of a gelatinous mass of muck which is extremely difficult to remove and greatly retards the flow. While the process of acidizing in accordance with my invention can be applied to wells cleaned by other methods, or to such new wells as do not require cleaning, the cleaning and the acidizing in accordance with my invention are carried out generally in the same manner, by the same apparatus, and preferably as a series of consecutive and similar steps, and if a well is to be acidized by my process many advantages are secured by also effecting the cleaning by my process. Among such advantages, for instance, are the fact that the cleaning by my process heats the well bore in the producing formation and the metal parts of the well, thereby rendering unnecessary the preheating which would be required if the well had been cleaned by other means, the fact that no changes need be made in the equipment and the great saving in time.

Under the methods of acidation heretofore used, the amount of acid varies greatly, and the amount used is largely a matter of judgment, based upon consideration of the results obtained in adjacent or similar wells, laboratory tests upon samples of the formation, the depth of the well, the thickness of the formation, and the results it is desired to obtain. When muriatic acid has been used it has generally been diluted with about an equal quantity of water, to form a 15 per cent, or weaker, solution, and the amount of such solution used has varied from 500 gallons to 20,000 gallons. In general, in carrying out my invention, I prefer to use commercial muriatic acid without dilution, and have found that about one half as much acid, that is, one fourth as many gallons as would be indicated for any particular well according to the previous methods, gives a much improved result.

For carrying out the process of my invention in both cleaning and acidizing an old well of average type, typical apparatus would be used, such as is shown in the accompanying drawings. As shown therein, the casing 11 is provided with a casing head 12, in which tubing 13 is secured. Laterally extending pipes 14 and 15 are connected to the tubing, and similar pipes 16 and 17 are connected to the casing head, each fitted with a valve, 18, 19, 20 and 21, respectively, pipe 14 being connected to pipe 16, and pipe 15 being connected to pipe 17, respectively, beyond the valves, preferably through T-joints having bull plugs 22 and 23 therein, respectively, which installation is usual, and commonly known as a "Christmas tree" connection. A choke valve 24 is usually provided in the tubing 13, and a pressure indicator 25 is suitably connected to the tubing. The pipe 17 is connected to separator 26, as shown, or to storage tanks, as desired. All of such installation is that usually used in a producing well.

The added equipment used is preferably carried on a truck, so as to be readily portable, and comprises a power means 27 driving a compressor 28, from which flow line 29 leads through a meter 30, a reservoir tank 31, to absorb pulsations, equipped with a pressure indicator 32, and through a valve 33 to a heater 34. To the flow line 29, between the tank 31 and the valve 33, there is connected a pipe 35 which is branched to connect to the tops of water tank 36 and "treatment liquid" tank 37, through valves 38 and 39, respectively. The tanks are equipped with pressure indicators 40 and 41, respectively, and with valved inlets 42 and 43, respectively. An atomizer 44 is connected in the flow line 29 between the valve 33 and the heater 34, to atomize into the flow line either water or treatment liquid, as desired, such atomizer being fed through a pipe 45 which is branched and connected through valves 46 and 47 to the bottoms of tanks 36 and 37, respectively. The heater 34 may be of any suitable construction and is connected by pipe 48 through a thermometer 49 to pipes 14 and 16, so as to feed to the tubing or casing or both, as desired.

In the case of a well equipped for pumping, the pumping equipment is removed from position to permit free access from the tubing to the bottom of the well. In any case, proper connection is made so that, when the valves 18, 19, 20 and 21 are closed, the top of both the casing and the tubing will be closed in, and so that the flow line may be connected to the tubing or casing as desired. I prefer to apply the heating medium and the vapors of treatment liquid through the tubing, rather than through the casing, thereby minimizing the loss of heat.

As a preliminary step, the producing formation adjacent the bottom of the well bore is heated by circulating into the tubing, through valve 18, to the bottom of the well and then back up through the casing, about the tubing, and through valve 21 to atmosphere, a gaseous heating medium at the rate of about 10,000 cu. ft. an hour, and at a temperature of, or exceeding, 250° F. The gas not only contacts with the face of the producing formation but bubbles up through, and heats and agitates, the fluid which generally is present in the bottom of the well, and through the fluid in the casing if there is any present therein, and tends both to melt paraffin or asphalt and to cause it to be again dissolved in the oil. This circulation is continued for about an hour under normal conditions, but would be maintained for a much longer period if the well is deeper than average, or if it is believed that the paraffin or similar deposits are particularly heavy. When the temperature of the gas escaping at the top of the casing has reached approximately the temperature of that initially entering the top of the tubing, and when likewise sufficient time has elapsed to warrant the conclusion that the metal parts of the well and the face of the producing formation have been cleaned, and that the paraffin and similar substances have been melted or dissolved, the preheating period is considered to be complete, and valve 21 is closed. The gas used as a heating medium is preferably natural gas, but in many localities natural gas is not available and air has been used frequently and satisfactorily, it being usually advisable to use a slightly greater quantity of air than of natural gas.

With only valve 13 open, the flow of the compressed gaseous heating medium is continued, to build up the pressure in the entire well to a point exceeding the rock pressure of the producing formation, in order to drive all of the fluid out of the bore at the bottom of the well and back into the producing formation. It will be appreciated that, under some conditions in which the oil level is at a considerable distance above the bottom, the pressure applied through the tubing will hold suspended between the tubing and casing a column of oil which, therefore, will not be forced back into the formation, but all of the fluid that is in the bore will be forced therefrom back into producing formation. During this period the pressure rises gradually and finally becomes practically stationary, at a pressure which is balanced by a pressure equal to the rock pressure of the well plus the pressure necessary to force the fluid through the pores of the formation. Of course, it will be realized that with some producing formations, such as "gravel wash" formations or cavernous formations, it is impossible to build up any material pressure, in which case determination of how long to continue the attempt to do so is merely a matter of judgment.

When the indicator 25 no longer shows a rise of pressure, carbon tetrachloride, casinghead gasoline, naphtha, benzine, kerosene, gas oil, or any other treatment liquid capable of dissolving paraffin or asphalt, depending upon the existing conditions and needs, is atomized into flow line 29, being forced into the jet in the atomizer 44 through pipe 45, by opening valve 47. It will be appreciated that the surface of the liquid in tanks 36 or 37 will have been subjected to a high pressure. For instance, after loading, a pressure, usually about 500 pounds per square inch, is applied by closing valve 33 and opening valve 38 or 39, respectively. It will likewise be understood that if casinghead gasoline, or similar liquids, are to be used in large quantity, they may be pumped into tank inlet 43 at whatever pressure is necessary, above that temporarily existing in the flow line, to effect atomization. Usually, the rate of atomization is about 100 gallons of liquid atomized into about 10,000 cubic feet of gas per hour. The rate at which the treatment liquid is atomized may be much higher when the operator is warranted in believing that it is readily permeating the formation, but, in general, it is believed that more thorough and more extended cleaning is effected by a given amount of treatment liquid if it is applied slowly during a more extended period, provided, of course, that the rate is always high enough to insure proper heating of the face of the formation.

The amount of treatment liquid used for permeating and cleaning the formation, as well as the length of the period during which it is applied, varies greatly with the conditions encountered. For instance, 50 gallons of casinghead gasoline applied in an hour was found to be sufficient to obtain the results expected in a producing formation of sandy lime only 5 feet thick, the well being only 330 feet deep. On the other hand, in a badly clogged well 3200 feet deep in a producing formation of hard sandy lime 70 feet thick, 250 gallons of casinghead gasoline was applied in 5 hours, and such treatment was effective, but it is believed that 150 gallons would have been insufficient to remove the paraffin.

By the time the well has been thus preheated, and thus cleaned in a manner which further heats it under pressure, as described, the cleaning vapor has been forced into the formation to a considerable distance from the bottom of the well bore, thereby both increasing the porosity and permeability of such portion of the formation, and heating a material volume of the formation, so that, for a considerable distance from the bore, the particles of the formation will be at the temperature of condensation of the liquid used, or a higher temperature.

After the desired amount of cleaning liquid has been applied, the acid treatment is begun, by placing in the tank 37 a charge of acid as desired, and applying to the surface thereof a pressure, usually about 500 pounds per square inch, but in any case materially greater than the pressure in the flow line, as described heretofore, and then again opening the valve 47. It will be understood that, in the interim, which usually is only a few minutes, the flow of the gaseous medium is continued without any reduction of pressure.

The acid is, in most cases, preferably applied in charges or increments, usually four, the number being much greater if an unusually large quantity of acid is to be used. The periods during which such charges are applied are alternated with periods, usually of about the same duration, during which the flow of the hot compressed gaseous medium is continued. At the beginning of, or sometimes throughout each of, such intermediate periods it has been in most cases my practice to atomize into the compressed gaseous medium a charge of water from tank 36, by opening valve 46, in order to "wash" the inside of the tubing by dissolving and decreasing the corrosive effect of, the acid vapor thereon, and to provide a medium for dissolving the calcium chloride and other products of reaction. Such periods of introducing acid and periods of introducing the compressed gaseous heating medium are continued alternately until the desired amount of acid has been applied.

At the beginning of each period of applying an acid charge, the pressure usually declines rapidly, sometimes to zero, which is an indication that the action of the acid upon the formation has opened up the pores thereof and permitted expansion into a greater volume of the formation.

After the desired acid charge has been introduced, the flow of the heated compressed gaseous medium is continued without interruption to force the acid vapor farther back into the formation and heat such extended horizons of the formation in preparation for another acid charge. During such alternate period, as the acid becomes spent, the pressure usually rises slowly, but it is not necessary, and in fact it is in some cases impossible within a reasonable time, to build the pressure up to that existing when the acid was first introduced.

Under most conditions, I have made the intermittent periods of about the same duration as the periods of introducing acid, but they may be shortened if the well is not deep, or if there is evidence that the well is not in need of more heating before the next acid charge, or if the pressure rather rapidly approaches that at the start of the acid treatment. The primary purpose of such intermittent gaseous treatments is both to force farther from the bottom of the well bore the acid vapor, or particles of acid vapor which have condensed within the formation but are not entirely spent, and to heat the formation as far as possible from the well bore to a temperature above the point of condensation of the acid vapor. A further purpose as stated heretofore, is to afford a means of conveying water in the form of steam to the inner surface of the tubing to lessen the corrosive action of the acid thereon, and to insure that salts resulting from the action of the acid will be dissolved.

After the final charge of acid has been introduced, the introduction of the heated, compressed gaseous medium is continued for the same purposes as described with reference to the intermediate periods, but as a rule the application period, after the final acid charge, is greatly extended, in order to build up the pressure, if possible, to at least the pressure that had been attained before the acid was applied. In any case, the period would be extended long enough to insure that the acid has become spent. The purpose of this period of application of gas under pressure is to insure that when at the end of such period, the pressure is suddenly released, the gaseous particles moving from the remote portions of the producing formation into the bottom of the well bore will carry along with them particles of water containing reaction products in solution therein, and particles of oil, paraffin or sand, and similar bodies. To obtain this flushing action is of course desirable that the pressure be as high as possible, so that the action will originate as far as possible from the bore and will be as violent as possible, to remove as many particles as possible and increase the tendency to form open channels in the formation and leading to the bore, and it is of course preferable that none of the acid be wasted by allowing it to escape prematurely. This final period usually is extended for two hours or more.

The pressure is then suddenly released by closing valve 18, and opening valve 19, or both valve 19 and valve 21. It will be appreciated that, in the case of a "flowing well," it would be preferable to open only valve 19, while in the case of a "pumping well," that is, one that it has been necessary to pump, it sometimes may be desirable to open valves 19 and 21, in order to release the pressure in both the tubing and the casing as suddenly as possible. The gases blown off escape and any liquid mixture of oil, salt water, etc., is run into the slush pit until the well has purged itself and the flow is suitable for use. Likewise, in the case of a pumping well, the undesirable liquid mixture is pumped out and discarded, or if desired, such undesirable mixture may be removed by bailing or swabbing, or similar means.

In case the well is merely preheated and then cleaned, the acidizing treatment being considered unnecessary or undesirable for any reason, the steps for cleaning are carried out exactly as hereinbefore described, and the well is placed "back in production" as above described, except that in such case it is usually preferable that the well be closed in and kept sealed until the pressure is substantially normal before placing the well "back in production." In this reduction of pressure to normal does not occur in a reasonable length of time, the pressure should be released and the well placed "in production."

An important distinction between applying to a well any treatment liquid in vapor form, as distinguished from application in liquid form is that, under the pressure applied, the vapor is uniformly distributed throughout the entire depth of the formation at the bottom of the well and attacks the wall uniformly regardless of the size and shape of the opening that may exist, so that the effect will tend to be that shown in Fig. 1. On the other hand, if the treatment liquid is dumped into the well in liquid form, and pressure is applied to the liquid, such pressure tends to force the liquid away from the bore near the bottom of the formation because of the greater pressure there, and because if the liquid can there enter the formation all of it may be fed into such part of the formation and never reach the higher portions of the formation. If the well has had a previous acidizing treatment, and as a result of such treatment, or for any other reason, there exists an opening of considerable size at the bottom of the well, such as shown in Fig. 1, it will be quite evident that a liquid acid charge of less volume than such opening could not possibly reach the upper parts of the formation, while a charge applied in vapor form would reach all of the surface of such an opening regardless of its size, and would attack all of such surface uniformly.

It will be understood that, while it is preferable to atomize the treatment liquid into the flowing stream of compressed gaseous medium and heat the mixture, such exact arrangement of the parts is not essential and that the compressed gaseous medium may be passed through the heater and the treatment liquid then atomized into the stream of heated compressed gaseous medium. Likewise, while it is distinctly preferable, for the reasons stated, to treat the well through the tubing, rather than through the casing, it will be understood that in shallow wells it would be possible to apply the treatment through the casing, particularly when the pressure necessary is low and when conditions are such that the loss of heat through the casing could be overcome.

It will be apparent that by the application of any treatment liquid as herein described, so that it reaches the preheated formation in vapor form, its effectiveness will be greatly enhanced over that of the same substance in liquid form, not only because it can be forced farther into the formation, by the same pressure, than a liquid could be forced, thus greatly increasing the volume of the formation which would be rendered permeable and porous, but also because such treatment liquids, upon increase of temperature, attack the same substances more actively and also attack substances which they would not attack at a lower temperature, and also because their action is more rapid and effective when in vapor form than when in liquid form.

What I claim is:

1. The method of treating a well to remove obstructions to flow, which comprises introducing into the well a heated gas at a pressure exceeding the rock pressure of the producing formation to preheat the producing formation adjacent the bottom of the well, and then introducing into the top of the well a gas comprising in vapor form a treatment liquid which is capable of attacking the obstructions to flow and which is liquid at normal temperatures, such gas being at a pressure exceeding the rock pressure of the producing formation and at a temperature above the point of condensation of such treatment liquid at the existing pressure.

2. The method of treating a well to remove obstructions to flow, which comprises introducing into the well adjacent its top a heated gas at a pressure materially exceeding the rock pressure of the producing formation to force from the bottom of the well bore back into the producing formation any fluid present in the bottom of the well bore and to preheat a portion of the producing formation adjacent the bottom of the well bore, and then introducing into the well adjacent its top a heated, compressed mixture of a gas and the vapor of a treatment liquid which is capable of changing the characteristics of the obstructions to flow and which is liquid at normal temperature and pressure, such mixture being introduced at a temperature exceeding the temperature of condensation of such treatment liquid at the rock pressure of the producing formation.

3. The method of treating a well to remove obstructions to flow, which comprises introducing into the well adjacent its top a heated, compressed gas for a period of sufficient duration to heat a portion of the producing formation, introducing into the well during a succeeding period a heated gaseous medium capable of dissolving paraffin and at a pressure exceeding the rock pressure of the producing formation, and introducing during a succeeding period a heated, gaseous medium containing in vapor form a reagent capable of reacting with particles of the producing formation and at a pressure exceeding the rock pressure of the producing formation.

4. The method of treating a well to remove obstructions to flow, which comprises introducing into the well a heated, compressed gas for a period of sufficient duration to build up a pressure exceeding the rock pressure of the producing formation, introducing into the well during a succeeding period a heated compressed gaseous medium capable of dissolving paraffin, and introducing into the well during a succeeding period a heated gaseous medium containing an acid in vapor form and at a pressure exceeding the rock pressure of the producing formation.

5. The method of treating a well to remove obstructions to flow, which comprises introducing into the well a heated, compressed gas for a period of sufficient duration to heat a portion of the producing formation, introducing into the well during a succeeding period a heated, compressed gaseous medium capable of dissolving paraffin, and then introducing into the well during alternate periods a heated, compressed gaseous medium containing an acid in vapor form and a heated, gaseous medium substantially free of acid at a pressure exceeding the rock pressure of the producing formation.

6. The method of treating a well to remove obstructions to flow, which comprises introducing into the well a heated, compressed gas for a period of sufficient duration to heat a portion of the producing formation, introducing into the well during a succeeding period a heated, compressed gaseous medium capable of dissolving paraffin and thereby building up a pressure exceeding the rock pressure of the producing formation, and introducing into the well during succeeding alternate periods a heated, gaseous medium containing an acid in vapor form compressed to a pressure exceeding the rock pressure of the producing formation and such heated, compressed gaseous medium substantially free from acid and containing steam during at least a part of such period.

7. The method of treating a well to remove obstructions to flow, which comprises compressing a gaseous medium to a pressure exceeding the rock pressure of the producing formation and heating it, maintaining a flow of such heated compressed gaseous medium into the well, and intermittently mixing with the stream of gaseous medium a treatment liquid in vapor form, the temperature of said gaseous medium being maintained at a point above the temperature of condensation of such treatment liquid at the existing pressure.

JOSEPH S. NORMAND.